May 31, 1955      D. S. GUSTIN      2,709,644
METHOD OF TREATING FLUORESCENT LAMP BULBS
Filed Feb. 27, 1951
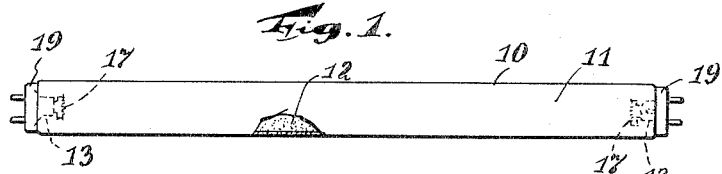
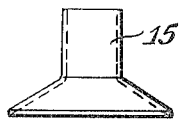
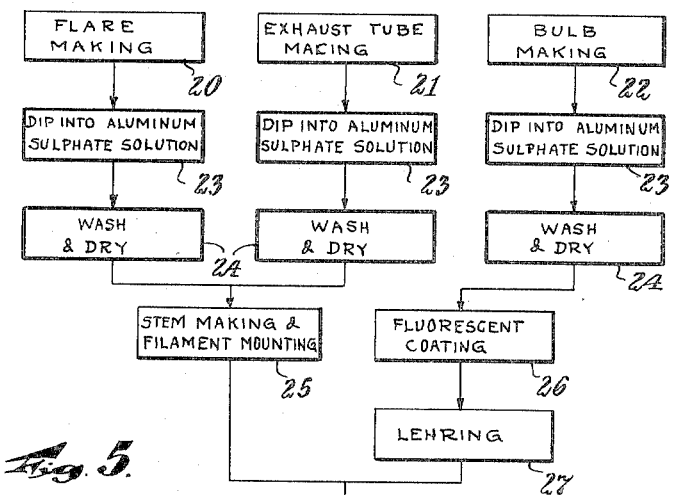
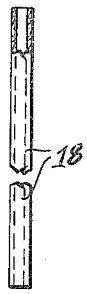
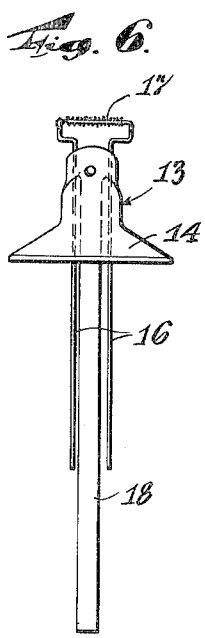
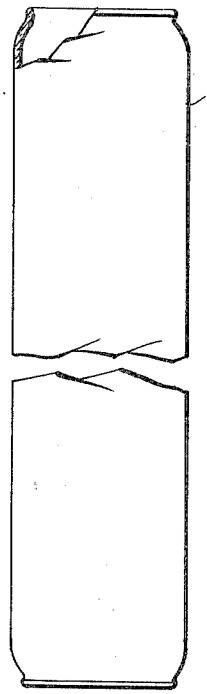
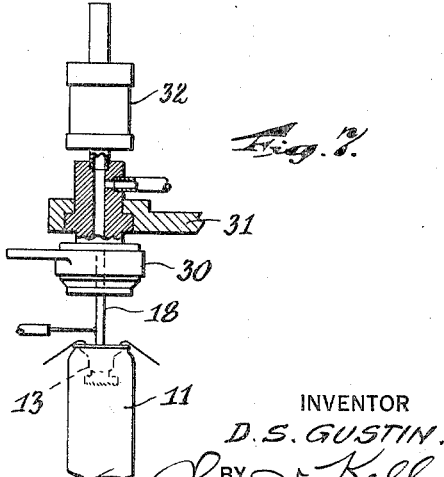
INVENTOR
D. S. GUSTIN
BY
ATTORNEY United States Patent Office 2,709,644
Patented May 31, 1955

2,709,644

METHOD OF TREATING FLUORESCENT LAMP BULBS

Daniel S. Gustin, Fairmont, W. Va., assignor to Westinghouse Electric Corporation, East Pittsburgh, Pa., a corporation of Pennsylvania Application February 27, 1951, Serial No. 213,016

1 Claim. (Cl. 41—42)

This invention relates to the treatment of glass and, more particularly, to the treatment of suitable envelopes for fluorescent lamps.

Present high speed automatic machines manufacturing fluorescent lamps, operate at an index of approximately one finished tube per second. While automatic equipment is used for flare and stem making, bulb phosphor coating, lehring of bulbs and stems, sealing in, and exhausting, considerable high speed manual transportation and resultant mutual bulb impact results. When two phosphor-coated bulbs bump together, the surface friction of the bulbs causes them to seize, or to have their contacting external surfaces take hold suddenly and forcibly and mutually nick, scratch, or cut said external surfaces at the point of contact. The glass bulb being a fused continuous mass, has sufficient elasticity to recover from the impact, but the phosphor coating being an adhering mass of particles, does not. The intimate bond between the inner surface of the bulb and the coating is broken at the point of impact. Gaseous material fills the newly-created void and either further impact or bulb evacuation can complete the removal of the weakened portion of the coating from the inner bulb wall.

Various attempts have been made to treat the envelopes of fluorescent lamps to avoid the chipping of the fluorescent material or phosphor therefrom. Lubricants such as mold release compounds were applied on the external bulb surface to reduce surface friction. However, after exhaust, the compound produces an undesirable iridescent scale which adversely affected light output. Carbon waxes, soluble in water, were applied to make the glass more slippery, but during sealing, the waxes were vaporized from the bulbs. Finally, it was found that sulphur dioxide gas coming into intimate contact with the outer glass surface of a heated bulb, interacts with alkali in the glass and probably oxygen in the air to form an alkali sulphate thereby rendering the glass surface richer in silica and poorer in alkali metal content.

After treatment, the glass surface is more slippery, tougher, harder, and thereby more resistant to surface nicking, scratching, and cutting.

Hence, it has been found advantageous, according to my invention, to wash bulb envelopes with a hot, two to ten percent by weight, colorless solution of aluminum sulphate on the inside surface, and/or on the outside surface. The alkali in the glass at its surface presumably combines with the sulphate ions in the solution to form alkali sulphates, thereby reducing the alkali metal content on the glass surface and leaving the surface richer in silica. The alkali sulphate and excess aluminum sulphate are removed during the usual hot water bulb washing operation. The resulting surfaces acquire a lower coefficient of friction and becomes more slippery. The hardness of the treated surface and its resistance to abrasion is increased. After treatment, when two pieces of glass are bumped together, there is less tendency to seize, and the force of the impact is lessened. As a result, chipping of the phosphor coating is decreased and the light output maintenance of the finished lamp is improved.

An object of the present invention is the washing of glass, such as envelopes for fluorescent lamps, with a hot solution of aluminum sulphate to reduce the coefficient of friction of the treated surface, to thereby lessen collision impact among bulbs, and avoid the chipping of phosphor coating therefrom.

A further object of the present invention is the washing of glass such as exhaust tubing with a hot aluminum sulphate solution to reduce the coefficient of friction and thereby prevent mercury when introduced therethrough from sticking to its surface.

Another object of the present invention is the washing of glass with a hot solution of aluminum sulphate to render the treated surface more resistant to abrasion.

A still further object of the invention is the treatment of glass with a hot solution of aluminum sulphate to form a silica-rich surface layer of low alkali metal content on which fluorescent material may be coated with improved lumen maintenance.

Another object of the present invention is the washing of glass with a hot solution of aluminum sulphate to form alkali sulphates which are readily removable from the glass by water.

Other objects of the invention will appear to those skilled in the art to which it appertains as the description thereof proceeds, both by direct recitation thereof and by implication from the context.

Referring to the accompanying drawing, in which like numerals of reference indicate similar parts throughout the several views:

Fig. 1 is an elevational view of a fluorescent lamp with a part of the envelope broken away to show the bulb coating;

Fig. 2 is a flow diagram showing the application of my invention in connection with the manufacture of fluorescent lamps;

Fig. 3 is an elevational view of a flare for a fluorescent lamp;

Fig. 4 is a fragmentary elevational view of an exhaust tube for a fluorescent lamp;

Fig. 5 is a fragmentary elevational view of an envelope for a fluorescent lamp;

Fig. 6 is an elevational view of a mount for a fluorescent lamp; and

Fig. 7 is a fragmentary vertical sectional view with parts in elevation, illustrating how my invention may be employed in the exhausting of fluorescent lamps.

Referring to the drawing in detail, a vitreous tubular envelope or bulb 10 of a fluorescent lamp 11 is shown in Fig. 1.

While a fluorescent lamp is shown as a specific embodiment of the present invention, it will be understood that the present invention is not restricted solely to use with fluorescent lamps. This envelope 10, namely a hollow vitreous or glass tube, having its extremities tapered suitably, axially and inwardly for sealing and basing, is coated with a fluorescent material 12 and sealed at each end to a mount 13. Such mount comprises a stem 14, consisting of a flare 15, two electrode lead-in conductors 16, and a filament or electrode 17 mounted on said conductors, as shown in Fig. 6. This flare 15 is a piece of glass tubing having one end flared axially outward. One of the electrode mounts 14 has a suitable tubulation 18 for evacuating the envelope and the admission of argon and mercury during the exhaust of said lamp 11. After exhaust, bases 19 are affixed to the lamp at both ends of the envelope.

Fig. 2 shows the application of my invention in connection with the manufacture of a fluorescent lamp 11. Here rectangles 20, 21 and 22 respectively designated "flare making," "exhaust tube making" and "bulb making" are connected to rectangles 23 designated "Dip into aluminum sulphate solution" and thence to rectangles 24 designated "wash and dry" in order to indicate that my aluminum sulphate treatment may be used after any and all of the mentioned operations.

According to my invention, sufficient powdered aluminum sulphate by weight is dissolved in a suitable amount of water to form a two to ten percent by weight solution, which is heated to approximately 100° F. This solution is strongly acidic, as indicated by a color change from blue to red in blue litmus paper. When the bulb 10, the flare 15, and exhaust tubulation 18, as shown in Figs. 3, 4 and 5 are washed, as by immersing, for a few seconds in said hot solution, it is believed that the alkali metals, present on the surface layer of the glass as silicates or carbonates, which are weakly acid, form an alkali metal sulphate on said surface layer. During the "wash and dry" operation warm water is flushed through and over the treated glass thereby removing the alkali metal sulphate which is readily soluble and any excess aluminum sulphate treating solution. This leaves a surface layer on the treated glass which is rich in silica content and has a tough slippery finish resistant to breakage. In the usual manner the treated glass, namely bulb 10, flare 15 and exhaust tubulation 18, is dried as in an appropriate air oven.

Referring again to Fig. 2, rectangle 25 indicated as "stem making and filament mounting" designates the assembly of flare 15, tubulation 18 and lead-in conductors 16 into a stem 14 on a suitable automatic stem making machine and the mounting of electrode 17 on said conductors 16 thereafter to form electrode mount 13.

Also in Fig. 2, rectangles 26 and 27 designated "Fluorescent coating" and "lehring" respectively dictate the successive operations of coating the inside of the treated bulb 10 with a fluorescent material as with a flushing solution and the lehring or baking said bulb to burn out and entirely remove the carbonaceous binder in said coating. It is believed that the lack of alkali in the surface layer of the inside of the treated bulb prevents any harmful chemical reaction with the fluorescent material coated thereon which is detrimental to lumen maintenance.

As indicated by rectangle 28 of Fig 2, namely "sealing in," an electrode mount 13 is sealed in one end of the coated and lehred envelope 10; and a similar electrode, lacking the tubulation 18 is sealed in the other end of said envelope as by a high speed automatic sealing machine.

Again in Fig. 2, rectangle 29 entitled "exhausting" designates the high speed automatic exhaust operation as on a suitable 32 port exhaust machine which may comprise loading said lamp in an inverted position, simultaneous pump and electric oven bake, cathode treatment, mercury dosing, as shown in Fig. 7, argon fill and tip off.

Referring to Fig. 7 in which the lamp 11 is being exhausted through tubulation 18, which tubulation is received and sealed into a compression rubber (not shown) enclosed in the head 30 of exhaust machine 31, fragmentarily illustrated. Said head involves a mercury doser 32 which prior to the tipping off operation by means of a flame, introduces the desired quantity of mercury through the exhaust tubulation 18 into lamp envelope 10. This tubulation 18 had been desirably treated with the aluminum sulphate solution of my invention, so that its inner surface is sufficiently slippery that no mercury adheres thereto.

Thus it will be seen from the foregoing that my invention involves the washing of glass such as envelope 10, with a hot solution of aluminum sulphate to reduce the coefficient of friction of the treated surface layer of said glass, thereby lessening collision impact damage among bulbs, appreciably decreasing chipping of the fluorescent coating therefrom, and improving lumen maintenance. Treatment of glass tubulation 18 with said solution prevents mercury when introduced into said envelope 10 therethrough from sticking to its surface. Further, this treatment of any glass, such as flare 15, with the solution of my invention forms a silica-rich layer of low alkali metal content which is resistant to abrasion. Washing glass with the aluminum sulphate solution forms alkali sulphates on the surface layer which are readily soluble, and hence removable from said glass by water.

Although a preferred embodiment of my invention has been disclosed, it will be understood that modifications may be made within the spirit and scope of the appended claim.

I claim:

The method of treating a fluorescent tubular vitreous lamp bulb containing an alkali metal comprising washing the inner and outer surfaces of said tubular bulb with a two to ten percent by weight solution of aluminum sulfate heated to approximately 100° F. whereby said alkali metal reacts with said aluminum sulfate to form a soluble alkali metal sulfate on said surfaces, washing said bulb to remove said soluble alkali metal sulfate from said surfaces, drying said washed bulb, coating the inner surface of said dried bulb with a fluorescent material, and lehring said coated bulb, said treating thereby reducing the coefficient of friction of the treated surfaces, lessening collision impact among coated bulbs and avoiding the chipping of fluorescent material therefrom.

References Cited in the file of this patent

UNITED STATES PATENTS

| | | |
|---|---|---|
| 1,791,066 | Smith | Feb. 3, 1931 |
| 2,175,076 | Burch | Oct. 3, 1939 |